(12) United States Patent
Darling

(10) Patent No.: US 9,029,031 B2
(45) Date of Patent: May 12, 2015

(54) VARIABLE AIR UTILIZATION INCREASES FUEL CELL MEMBRANE DURABILITY

(75) Inventor: Robert M. Darling, South Windsor, CT (US)

(73) Assignee: Ballard Power Systems Inc., Burnaby (CA)

( * ) Notice: Subject to any disclaimer, the term of this patent is extended or adjusted under 35 U.S.C. 154(b) by 744 days.

(21) Appl. No.: 13/261,079

(22) PCT Filed: Jul. 16, 2009

(86) PCT No.: PCT/US2009/004104
§ 371 (c)(1),
(2), (4) Date: Dec. 13, 2011

(87) PCT Pub. No.: WO2011/008189
PCT Pub. Date: Jan. 20, 2011

(65) Prior Publication Data
US 2012/0088173 A1 Apr. 12, 2012

(51) Int. Cl.
*H01M 8/04* (2006.01)
*H01M 8/10* (2006.01)

(52) U.S. Cl.
CPC ...... *H01M 8/04059* (2013.01); *H01M 8/04119* (2013.01); *H01M 8/0432* (2013.01); *H01M 8/0435* (2013.01); *H01M 8/04589* (2013.01); *H01M 8/04701* (2013.01); *H01M 8/04753* (2013.01); *H01M 2008/1095* (2013.01); *H01M 2250/20* (2013.01); *Y02E 60/50* (2013.01); *Y02T 90/32* (2013.01)

(58) Field of Classification Search
CPC .................. H01M 8/04059; H01M 8/0432
See application file for complete search history.

(56) References Cited

U.S. PATENT DOCUMENTS

| | | | | |
|---|---|---|---|---|
| 6,045,934 | A * | 4/2000 | Enami | 429/439 |
| 7,029,775 | B2 | 4/2006 | Horiguchi et al. | |
| 2004/0096709 | A1* | 5/2004 | Darling et al. | 429/13 |
| 2005/0096858 | A1 | 5/2005 | Okuda | |
| 2006/0141330 | A1 | 6/2006 | Reiser et al. | |

FOREIGN PATENT DOCUMENTS

| | | |
|---|---|---|
| JP | 2002-231283 A | 8/2002 |
| JP | 2005-135857 A | 5/2005 |
| KR | 10-0766473 B1 | 10/2007 |

OTHER PUBLICATIONS

International Search Report, mailed Apr. 19, 2010, for International Application No. PCT/US2009/004104, 2 pages.

* cited by examiner

*Primary Examiner* — Maria J Laios
(74) *Attorney, Agent, or Firm* — Seed IP Law Group PLLC

(57) ABSTRACT

A fuel cell stack (10) is operated with a low air utilization which is very low when the stack is providing low current density, and is operated with air utilization increasing as a function of current density above a predetermined current density.

6 Claims, 2 Drawing Sheets

VARIABLE AIR UTILIZATION INCREASES FUEL CELL MEMBRANE DURABILITY

TECHNICAL FIELD

A fuel cell stack is operated at low current densities with low utilization of oxidant (referred to herein as "air", for simplicity) which may be about half of normal air utilization (for instance), and operated at higher current density operation with increasing air utilization.

BACKGROUND ART

Evaporatively cooling a fuel cell stack is disclosed in Publication US 2006/0141330 A1. In contrast with sensible cooling management systems, in which heat generated in the stack is conveyed either to circulating water passing through the cells or to coolant passing through coolant plates, heat is removed by evaporating the water into the air stream. Benefits of evaporative cooling include a much lower inventory of coolant (typically water), fewer water carrying auxiliary components external to the stack, and a more compact cell design with shallower coolant and air channels.

However, polymer electrolyte membrane (PEM) fuel cells that are evaporatively cooled have lower membrane durability because of higher operating temperatures. In sensibly cooled fuel cell stacks, operation at all current densities with air utilization greater than about 60%, for example, maintains the cell stack in water balance (that is, the amount of water exiting with the air stream is equal to the amount of water which is produced by the cells). The relatively high air utilization allows the gas to exit the cells at a temperature of approximately 65° C. (about 150° F.) at ambient exit pressure. On the other hand, an evaporatively cooled fuel cell stack operating around 60% air utilization will have an air exit temperature of approximately 85° C., increasing slightly as a function of current density.

SUMMARY

A primary premise of the methodology presented herein is that an evaporatively cooled fuel cell stack does not operate in water balance, and therefore the air utilization of the cell does not have to be constrained for the sake of water balance. Fuel cell systems are designed to operate in water balance on an overall basis so that external water sources are not needed. This is a critical requirement in a mobile power plant. Evaporatively cooled power plants do operate in water balance just like other types; however, evaporative cooling offers some advantages and added flexibility in the power plant design. Evaporative cooling can be advantageous because: 1) it raises the reactant exit temperatures which reduces the required radiator size; 2) it reduces the total water volume required because much less flow is required in evaporation versus sensible heat removal; 3) it helps deal with freezing issues because less water has to be managed and 4) it allows for a reduced cell pitch (more cells per/inch) which increases power density.

Operating the fuel cell stack with low air utilization (high reactant flow) at low current densities, and increasing the air utilization as current density increases results in (a) the fuel cell stack operating at lower temperatures during those periods of operation where the fuel cell stack is operating at low current density, and (b) while limiting flow at high current density so as to avoid the need for an impermissibly large condenser (radiator) and oxidant blower or compressor. Fuel cell power plants utilized in mobile systems, such as city buses and package delivery trucks have a duty cycle with a low power requirement for the majority of the duty cycle operating time. The use of lower air utilization than the assumed nominal 60% requires excess air which will help lower the stack operating temperature and thereby extend the useful life of the proton exchange membranes within the cells.

Other variations will become more apparent in the light of the following detailed description of exemplary embodiments, as illustrated in the accompanying drawings.

MODE(S) OF IMPLEMENTATION

Figure 1:
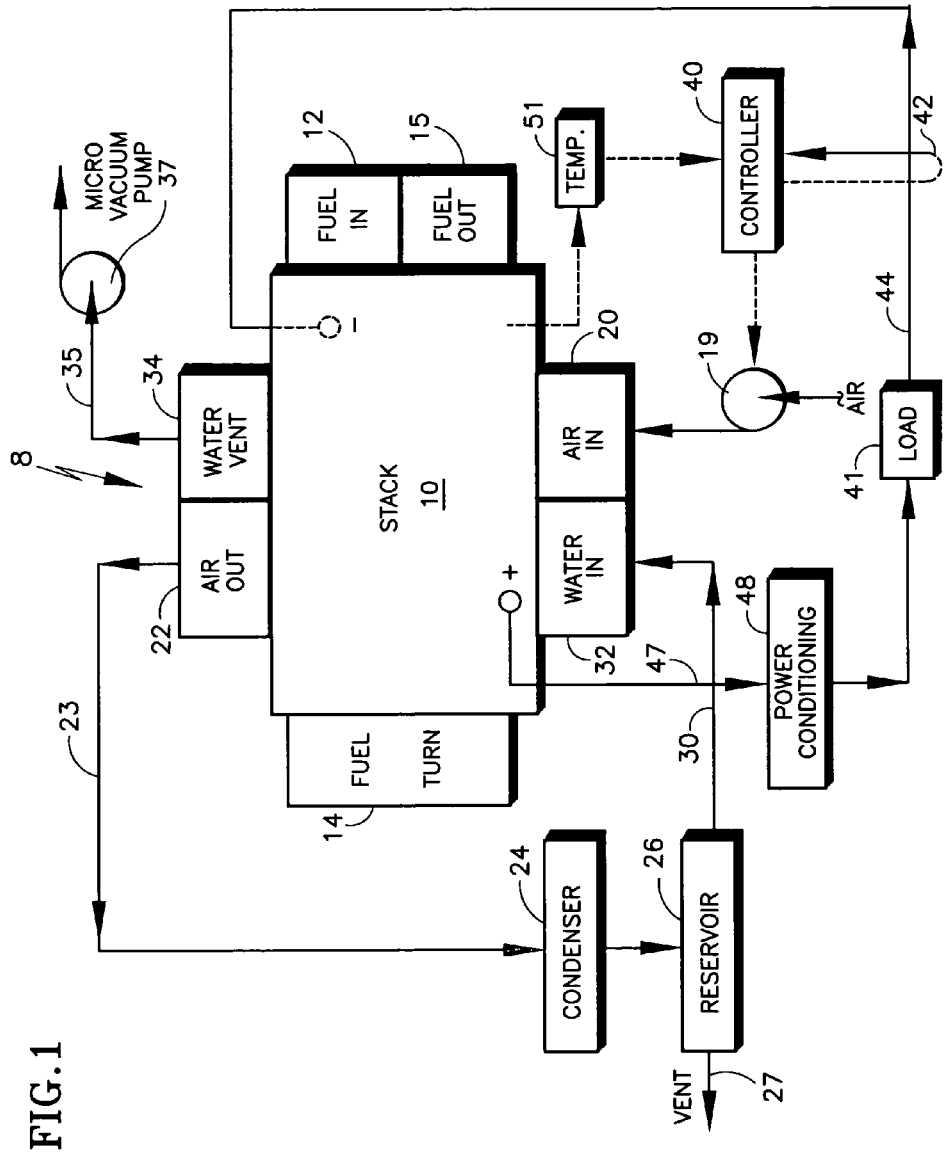
FIG. 1 is a simplified, stylized block diagram of a portion of a fuel cell power plant in which the present modality may be practiced.

An evaporatively cooled fuel cell power plant 8 of the type disclosed in the aforementioned publication is briefly illustrated in FIG. 1. Fuel flows from a fuel inlet manifold 12 toward the left as seen in FIG. 1 through a fraction of the fuel flow paths of all the fuel cells in a stack 10, and is turned, in a fuel turn manifold 14, to cause fuel to pass through the remaining portion of all of the fuel cells, toward the right as seen in FIG. 1, to a fuel outlet manifold 15.

Air is provided by a pump or blower 19 to the air inlet manifold 20, the air flowing upwardly (as seen in FIG. 1) to an air outlet manifold 22. The air is ducted, such as through a conduit 23, to a condenser 24 wherein the water is condensed out of the air exhaust stream and collects in a reservoir 26, which may be referred to as an "accumulator". The air stream is then exhausted through a vent 27, which may include a valve to set pressure before the vent.

A conduit 30 provides the condensed water to a water inlet manifold 32. Water passes into passageways within the stack 10 which terminate at a water vent 34 that is connected by a conduit 35 to a microvacuum pump 37. On the other hand, as described in the aforementioned publication, the water passageways in an evaporatively cooled fuel cell stack may be dead-ended, or may simply be vented to atmosphere, the water not necessarily flowing through the passageways. As described in the aforementioned publication, the microvacuum pump 37 may establish a small vacuum at the vent 34 to assure that water reaches and fills all of the passageways, and therefore is available to all of the active area of all of the cells. The water passes through the porous, hydrophilic reactant gas channel plates, sometimes referred to as water transport plates, into the reactant stream (which is the air stream in the embodiment of the aforementioned publication) to be evaporated by the heat generated in the stack and carried as vapor in the reactant stream.

The amount of air provided by the pump 19 is determined by a controller 40 which is responsive to current provided to a load 41 as illustrated by a current sensor 42 coupled to a load return line 44. On the other hand, the current sensor 42 may be coupled more directly to the stack current, such as being coupled to the stack power output line 47. Conventional power conditioning 48 will typically be provided between the stack 10 and the load 41.

The controller 40 may also be responsive to temperature 51 of either a particular cell in the stack or developed as a composite of temperatures at various parts of the stack. Or, in practice of the current modality, the temperature of the controller may respond to the difference between the air exit temperature at the air outlet manifold 22 and the coolant inlet temperature.

The foregoing description is illustrative and is presented only as a foundation for the description which follows.

Figure 2:
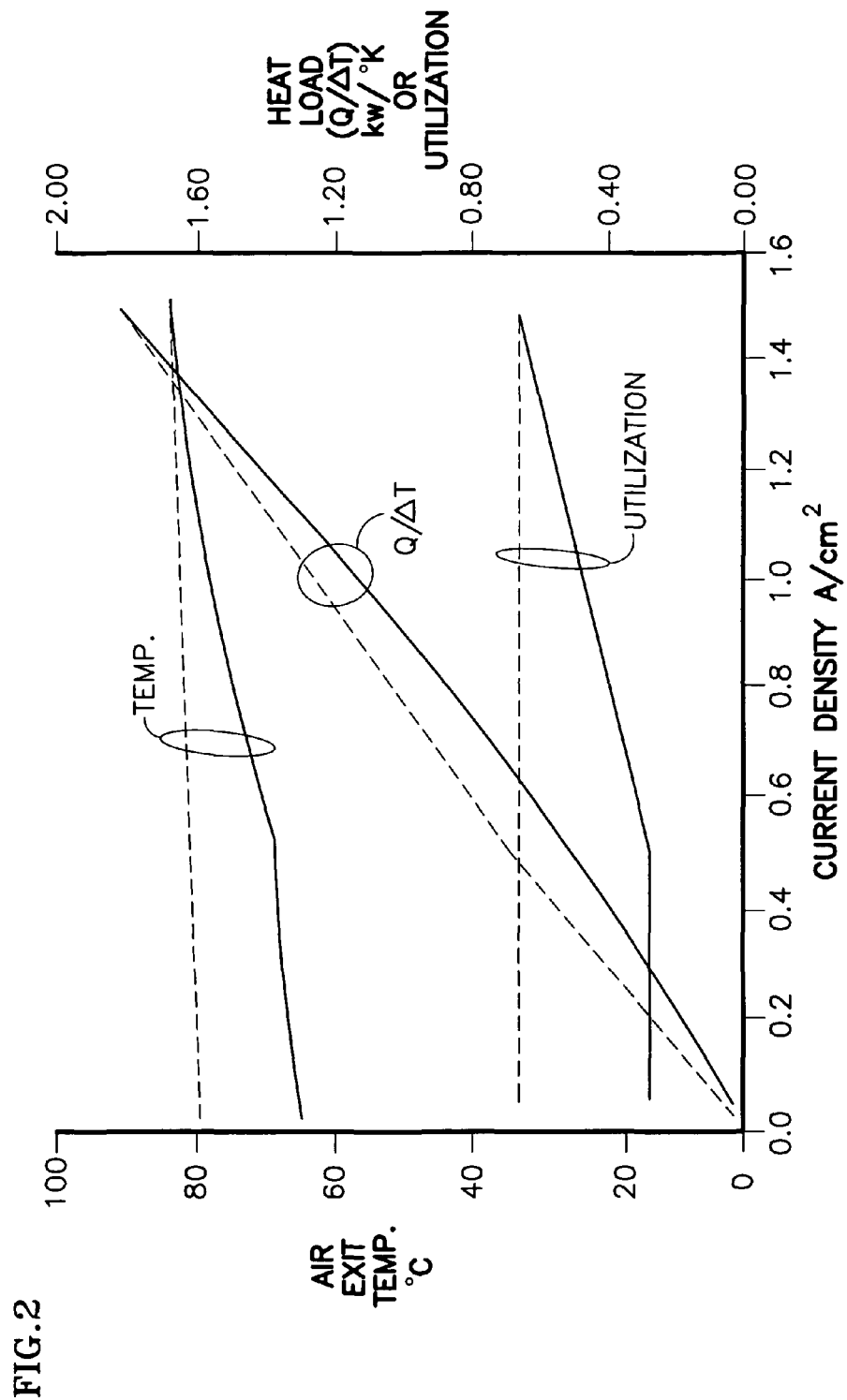
FIG. 2 is a chart illustrating fuel cell stack temperatures and air stream condenser requirements as a function of current density, for a fixed 60% air utilization, and for a variable air utilization in accordance with the present modality.

FIG. 2 illustrates parameters of the present modality (in solid lines) for comparison with similar parameters which obtain in a fuel cell stack having a utilization which is held constant at 60% at various current densities (in dotted lines).

When an evaporatively cooled, proton exchange membrane fuel cell stack is operated with a constant air utilization of about 60%, the cell air exit temperature may be about 80° C., and the heat load, expressed as the quantity of generated heat (Q) in kilowatts divided by the temperature difference between the water inlet temperature and the air outlet temperature, rises nearly linearly with current density.

On the other hand, when an evaporatively cooled, proton exchange membrane fuel cell stack is operated in accordance with the present modality, the controller 40 operates the air pump 19 to provide air utilization about 30% or less for current densities below 0.5 amperes per square centimeter. The pump is operated to cause air utilization to rise essentially linearly as a function of current density.

It should be noted that the schedule for a utilization set point can be made according to a rate that is shown to benefit operation of the power plant. The utilization change in turn results in the temperature initially being just above 60° C., and rising somewhat until the utilization is increased, as shown in FIG. 2. As the utilization increases, the temperature increases along a curve as shown, but remains well below the constant utilization case until it reaches the same oxidant exit temperature at the high end set point of 1.4 amps/cm$^2$ and 60% utilization.

The reduction in temperature of about 20° C. brings the membrane into an operating temperature regime similar to a sensibly cooled power plant. It is significant that the deterioration of the membranes by chemical attack will be significantly less at the lower temperature. Other decay mechanisms including dissolution of cathode catalyst and corrosion of carbon supports will occur more slowly.

In any application, where the fuel cell power plant may be operated at lower current densities, such as typical vehicle driving cycles that include idling at a stop, coasting to a stop, or traveling downhill, the temperature of the membranes will be lower and there will be less damage to the membranes and other cell components.

The invention claimed is:

1. A method characterized by:
    operating an evaporatively cooled fuel cell power plant in a manner to provide air utilization of less than about 40% while the power plant is producing electric power at current densities at or below a predetermined current density, and operating the fuel cell power plant with air utilization as a function of current density for current densities in excess of said predetermined current density, wherein said predetermined current density is about one-third of maximum current density.

2. The method of claim 1, further comprising:
    detecting a current of the fuel cell power plant; and
    providing an amount of air to the fuel cell power plant based on the detected current.

3. The method of claim 1, further comprising:
    adjusting a temperature of the fuel cell power plant based on a difference between an air exit temperature and a coolant inlet temperature.

4. A method characterized by:
    operating an evaporatively cooled proton exchange membrane fuel cell stack with a first predetermined air utilization when the stack is providing current density near maximum current density;
    operating said fuel cell stack with a second predetermined air utilization which is less than half of said first predetermined air utilization when the stack is providing current density less than a predetermined current density; and
    operating said fuel cell stack with air utilization between said second predetermined air utilization and said first predetermined air utilization as a function of current density provided by said stack between said predetermined current density and said maximum current density, wherein said predetermined current density is about one-third of maximum current density.

5. The method of claim 4, further comprising:
    detecting a current of the fuel cell stack; and
    providing an amount of air to the fuel cell stack based on the detected current.

6. The method of claim 4, further comprising:
    adjusting a temperature of the fuel cell stack based on a difference between an air exit temperature and a coolant inlet temperature.

* * * * *